(12) United States Patent
Qiao et al.

(10) Patent No.: US 10,481,705 B2
(45) Date of Patent: Nov. 19, 2019

(54) ACTIVE STYLUS SYNCHRONIZATION WITH MULTIPLE COMMUNICATION PROTOCOLS

(71) Applicant: Microsoft Technology Licensing, LLC, Redmond, WA (US)

(72) Inventors: Tianzhu Qiao, Portland, OR (US); Jonathan Westhues, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 115 days.

(21) Appl. No.: 15/376,189

(22) Filed: Dec. 12, 2016

(65) Prior Publication Data

US 2018/0164904 A1 Jun. 14, 2018

(51) Int. Cl.
*G06F 3/038* (2013.01)
*G06F 3/041* (2006.01)
*G06F 3/0354* (2013.01)
*G06F 3/044* (2006.01)

(52) U.S. Cl.
CPC ........ *G06F 3/0383* (2013.01); *G06F 3/03545* (2013.01); *G06F 3/044* (2013.01); *G06F 3/0416* (2013.01); *G06F 3/04162* (2019.05)

(58) Field of Classification Search
CPC ...... G06F 3/0383; G06F 3/0416; G06F 3/044; G06F 3/03545; G06F 2203/04106; G06F 2203/04105; G06F 3/04162
See application file for complete search history.

(56) References Cited

U.S. PATENT DOCUMENTS

| | | | |
|---|---|---|---|
| 6,930,673 B2 | 8/2005 | Kaye et al. | |
| 9,081,448 B2 | 7/2015 | Geaghan | |
| 2006/0012580 A1 | 1/2006 | Perski et al. | |
| 2011/0310031 A1* | 12/2011 | Harris | G06F 1/1616 345/173 |
| 2013/0207926 A1* | 8/2013 | Kremin | G06F 3/0383 345/174 |
| 2013/0249870 A1 | 9/2013 | Slaby et al. | |

(Continued)

OTHER PUBLICATIONS

Garcia-Salicetti, et al., "Digitizing Tablet", In Publication of Springer US, Retrieved on: Sep. 14, 2016, 4 pages.

*Primary Examiner* — Brent D Castiaux
(74) *Attorney, Agent, or Firm* — Alleman Hall Creasman & Tuttle LLP (57) ABSTRACT

An active stylus includes a stylus electrode configured to electrostatically couple with one or more electrodes of a display device having a capacitance-based touch sensor, transmit logic configured to drive the stylus electrode with a synchronization waveform that is configured, via interpreting a response on one or more electrodes of a first display device, to enable the first display device to become time synchronized with the active stylus in a stylus-initiated synchronization mode, receive logic configured to interpret a response on the stylus electrode caused by a synchronization waveform being driven on one or more electrodes of a second display device, to enable the active stylus to become time synchronized with the second display device in a display-initiated synchronization mode, and a controller configured, in response to detection of a condition, to cause the active stylus to switch from one of the synchronization modes to the other.

18 Claims, 5 Drawing Sheets

(56) References Cited

U.S. PATENT DOCUMENTS

| | | |
|---|---|---|
| 2014/0240298 A1* | 8/2014 | Stern .................... G06F 3/0383 |
| | | 345/179 |
| 2015/0256329 A1* | 9/2015 | Cheong .................. G06F 3/041 |
| | | 375/371 |
| 2015/0261343 A1 | 9/2015 | Leigh |
| 2015/0346847 A1* | 12/2015 | Zachut ................ G06F 3/03545 |
| | | 345/174 |
| 2016/0117047 A1 | 4/2016 | Dinu et al. |
| 2016/0195943 A1 | 7/2016 | Gur et al. |
| 2016/0209940 A1 | 7/2016 | Geller et al. |

* cited by examiner

FIG. 7

ACTIVE STYLUS SYNCHRONIZATION WITH MULTIPLE COMMUNICATION PROTOCOLS

BACKGROUND

Touch-sensitive display devices allow user interaction via touch input. While a user's finger may provide effective interaction for a range of scenarios, in some cases it may be desirable to also make use of an active stylus. Typically, an active stylus and an associated display device are configured to establish and maintain a shared sense of time with one another to facilitate interaction (e.g., touch sensing, position sensing, data transmission). In particular, a communication protocol used by the active stylus and the touch-sensitive display device may enable such synchronization.

DETAILED DESCRIPTION

As discussed above, time synchronization between an active stylus and a touch-sensitive display device may be enabled via a communication protocol used by both of the devices. Such a communication protocol may define particular communication characteristics (e.g., synchronization waveforms, touch-sensing frame arrangements, and frame rates) that enable communication between the active stylus and the touch-sensitive display device. Some communication protocols specify that synchronization is initiated by the active stylus, with others specify that synchronization is initiated by the touch-sensitive display device. As such, an active stylus that uses a stylus-initiated communication protocol may not work with a touch-sensitive display device that uses a display-initiated communication protocol. Likewise, an active stylus that is configured to use a display-initiated communication may not work with a touch-sensitive display device that uses a stylus-initiated communication protocol.

Accordingly, the present description contemplates an active stylus that supports multiple modes of operation. These modes use different communication protocols to enable the active stylus to synchronize with different touch-sensitive devices that use the different communication protocols. In one example, an active stylus includes a stylus electrode, transmit logic, receive logic, and a controller. The stylus electrode is configured to electrostatically couple with one or more electrodes of a touch-sensitive display device having a capacitance-based touch sensor. The transmit logic drives the stylus electrode with a synchronization waveform which is configured, via interpretation of an induced response on one or more electrodes of a first display device, to enable the first display device to become time synchronized with the active stylus. This mechanism is referred to as a stylus-initiated synchronization mode.

The receive logic is configured to interpret a response on the stylus electrode caused by a synchronization waveform being driven on one or more electrodes of a second display device. This enables the active stylus to become time synchronized with the second display device. This mechanism is referred to as a display-initiated synchronization mode. The controller is configured to cause the active stylus to switch from one of the synchronization modes to the other in response to detection of a condition. The controller intelligently selects the appropriate operating mode to enable synchronization with a particular touch-sensitive display device detected based on the condition.

By being operable in different synchronization modes that use different communication protocols, an active stylus can synchronize and interact with different touch-sensitive display devices that use the different communication protocols. Moreover, by intelligently switching between the different synchronization modes based on detected operating conditions, the active stylus can operate in the appropriate synchronization mode to synchronize with a particular touch-sensitive display device based on detected operating conditions.

Figure 1A:
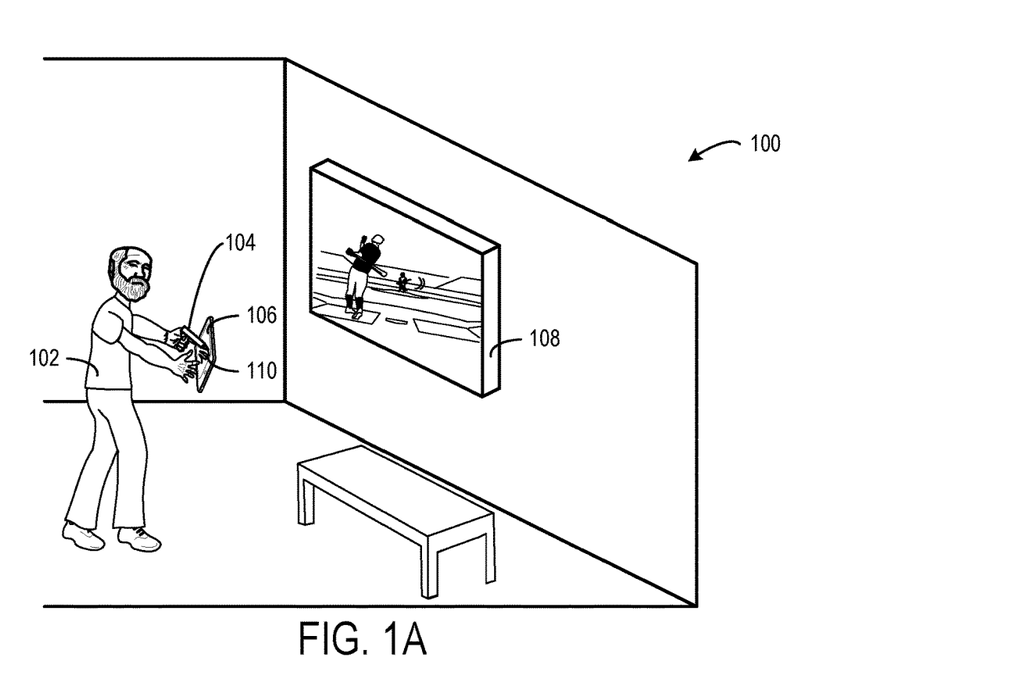
FIG. 1A shows a user interacting with a small-format touch-sensitive display device with an active stylus.
Figure 1B:
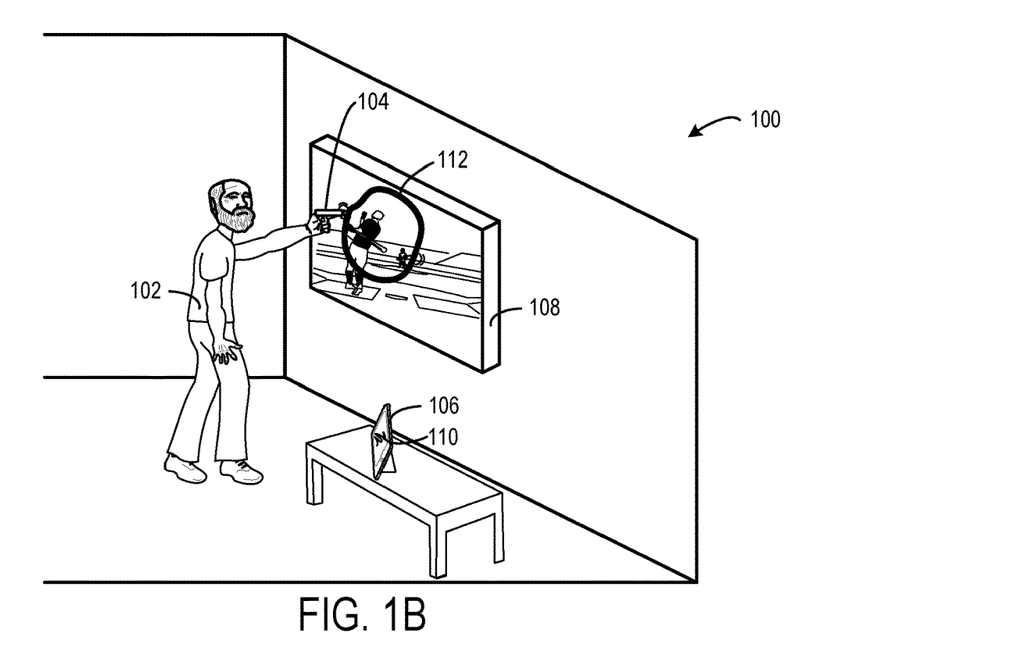
FIG. 1B shows the user interacting with a large-format touch-sensitive display device with the active stylus of FIG. 1A.

FIGS. 1A and 1B show an environment 100 in which a user 102 interacts with various touch-sensitive devices using a touch input device in the form of an active stylus 104. The environment 100 includes a small-format, touch-sensitive display device 106 and a large-format, touch-sensitive display device 108. The small-format, touch-sensitive display device 106 is a portable display device, such as a tablet computer, that can be carried by the user 102 around the environment 100. The large-format, touch-sensitive display device 108 is a wall-mounted display device having a fixed position in the environment 100.

Each of the touch-sensitive display devices 106 and 108 may be configured to sense one or more sources of touch input, such as touch input imparted via a finger of the user 102 (or another user) and/or touch input supplied by another touch input device. The touch-sensitive display devices 106 and 108 may be configured to receive input from touch input devices in contact with the touch-sensitive display devices and touch input devices not in contact with the touch-sensitive display device (e.g., input devices that hover proximate to a surface of the display). "Touch input" as used herein refers to both types of input. In some examples, the touch-sensitive display devices may be configured to receive input from two or more sources simultaneously, in which case the touch-sensitive display devices may be referred to as multi-touch display devices.

In FIG. 1A, the user 102 is holding the small-format, touch-sensitive display device 106. The user 102 provides touch input to device 106 via the active stylus 104. In particular, the active stylus 104 intelligently operates in a mode that uses a communication protocol supported by the touch-sensitive display device 106 to enable the touch-sensitive display device 106 to time synchronize with the active stylus 104.

In one example, the active stylus 104 electrostatically transmits, via a stylus electrode, a synchronization waveform according to a communication protocol while operating in a stylus-initiated synchronization mode. The touch-sensitive display device 106 receives the synchronization waveform via a capacitive coupling between (i) one or more electrodes of a capacitance-based touch sensor of the touch-sensitive display device 106 and (ii) the stylus electrode of the active stylus 104. Further, the touch-sensitive display device 106 uses the synchronization waveform to adjust a timing in order to gain a shared sense of time with the active stylus 104. Once time synchronized, touch input provided by the active stylus 104 is accurately recognized by the touch-sensitive display device 106, and in response the touch-sensitive display device 106 generates appropriate graphical output 110.

In FIG. 1B, the user 102 has turned his attention away from the small, format touch-sensitive display device 106 to interact with the large-format, touch-sensitive display device 108. Specifically, the user 102 applies touch input to the large-format device with the active stylus 104. To facilitate this transition, the active stylus 104 intelligently switches to operate in a mode that uses a communication protocol that is shared by the touch-sensitive display device 108, so as to enable the active stylus 104 to synchronize with the touch-sensitive display device 108.

In one example, the active stylus 104 receives a synchronization waveform from the touch-sensitive display device 108 when the active stylus 104 is positioned proximate to the touch-sensitive display device 108. This enables a display-initiated synchronization mode. The synchronization waveform is received by the active stylus 104 via a capacitive coupling between the stylus electrode and the one or more electrodes of the touch sensor. The active stylus 104 uses the synchronization waveform to adjust a timing in order to gain a shared sense of time with the touch-sensitive display device 108. Once the active stylus is time synchronized, touch input provided by the active stylus 104 is recognized by the touch-sensitive display device 108, and in response the touch-sensitive display device 108 generates appropriate graphical output 112.

The depicted scenario is meant to be non-limiting. The active stylus 104 may be configured to switch between any suitable number of different synchronization modes and associated communication protocols. The active stylus 104 may synchronize with any suitable type of touch-sensitive device based on operation in such synchronization modes. Moreover, the active stylus 104 may switch between different synchronization modes based on any suitable operating conditions.

Figure 2:
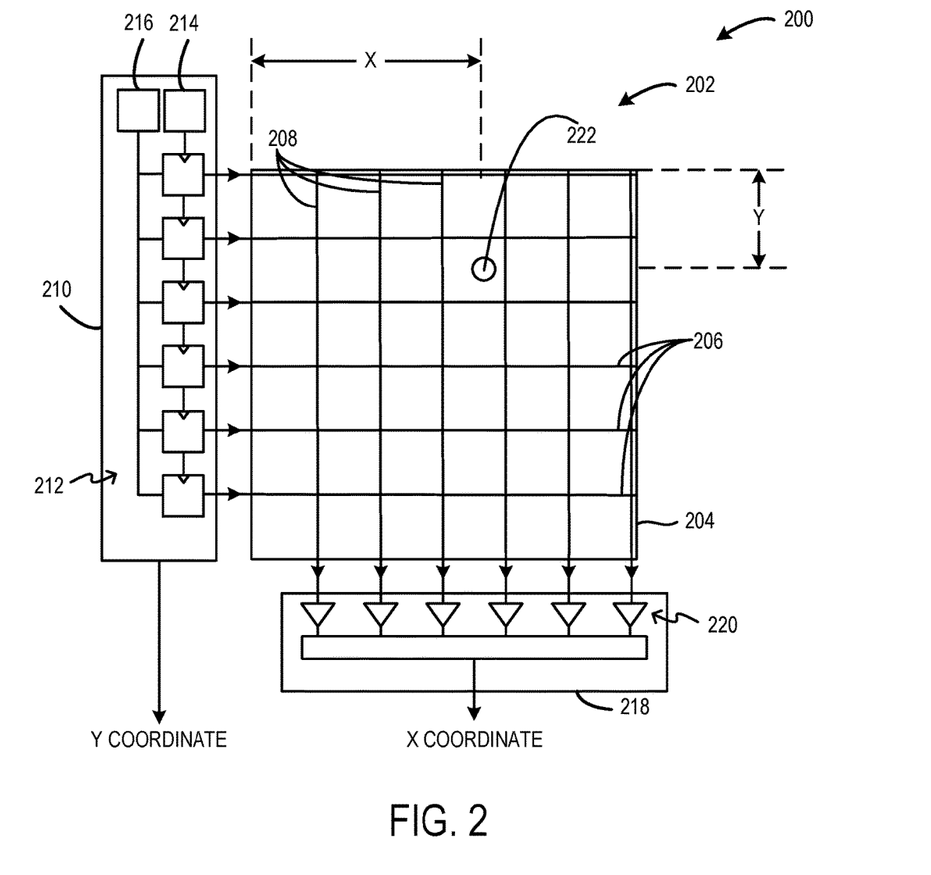
FIG. 2 shows a touch sensor that may be implemented in a touch-sensitive display device such as any of the touch-sensitive display devices of FIGS. 1A and 1B.

FIG. 2 depicts a touch sensor 200 and its underlying touch-sensing architecture. The touch sensor 200 may be included in any suitable touch sensing device including, but not limited to, the devices of FIGS. 1A and 1B. The touch sensor 200 includes an electrode matrix 202 arranged parallel to a display subsystem of the touch display device. Typically, this involves the electrode matrix 202 being arranged over, or at some depth within, the display subsystem. This disclosure further contemplates non-display implementations, such as a touch panel device that does not include a display.

The electrode matrix 202 includes a series of rows 206 (e.g., row electrodes) and a series of columns 208 (e.g., column electrodes) arranged on a sensory surface 204. The electrode matrix 202 may include any number N of rows 206 and any number M of columns 208. Further, although it is customary to have the rows 206 aligned horizontally and the columns 208 aligned vertically, this aspect is in no way necessary: indeed, the terms 'row' and 'column' may be exchanged everywhere in this description. For example, the terms row and column do not denote a global orientation but rather denote the orientation, typically at right angles, of the electrodes with respect to one another. The rows 206 of the electrode matrix 202 are sequentially electrically excited and the columns 208 of the electrode matrix 202 are scanned to pick up an incoming signal for downstream touch sensing operations, discussed in greater detail herein.

The touch sensor 200 is configured to sense passive or active touch inputs at or near the sensory surface 204 of the electrode matrix 202. The touch sensor 200 includes a drive subsystem 210 and a receive subsystem 218 to effect such touch sensing functionality. In particular, these subsystems serve to (1) influence electrical conditions on the electrode matrix 202 (e.g., by driving row electrodes with voltage waveforms) and (2) respond to and interpret electrical conditions on the electrode matrix 202 (e.g., with various circuitry attached to column electrodes).

The drive subsystem 210 electrically couples to the rows 206 and is configured to scan, over the course of a "touch sensing frame," all of the rows of the electrode matrix 202. The scanning, or driving, typically occurs row-by-row, one row at a time. In many cases, the scanning is performed serially from the top to the bottom of the electrode matrix 202, or vice versa. In some cases, rather than individual scanning of row lines, two or more rows may be driven at the same time, but in an overall serial manner (meaning only one row, or a relatively small number of rows, is excited at a given time). Operation of the drive subsystem 210 and row electrodes 206 may be variously referred to herein as "driving," "scanning," "stimulating," or "exciting" the row electrodes 206. In each case, this refers to applying a voltage waveform or other electrical signal that induces or varies electrical conditions on the electrode being driven, stimulated, etc.

The drive subsystem 210 may include a row counter 212 in the form of an N-bit shift register with outputs driving each of N rows 206. The row counter 212 may be clocked by row-driver clock 214. The row counter 212 can include a blanking input to temporarily force all output values to zero independent of the values stored. Excitation of one or many rows may be provided by filling the row counter 212 with ones at every output to be excited, and zeroes elsewhere, and then toggling the blanking signal with the desired modulation from modulation clock 216. In the illustrated implementation, the output voltage may take on only two values, corresponding to the one or zero held in each bit of the row counter; in other implementation, the output voltage may take on a greater range of values, to reduce the harmonic content of the output waveforms, or to decrease radiated emissions, for example.

The description above of the row counter 212 should not be construed as limiting in any way, for numerous alternative implementations are equally contemplated. For instance, the row counter 212 may be implemented as a micro-coded state machine within a field-programmable gated array (FPGA) with the touch-sensing logic described herein. In other implementations, the row counter 212 may take the form of a register within a microprocessor, or as a data structure held in computer memory associated with the microprocessor. In these and other implementations, the row counter may take on non-negative integer values—e.g., 0, 1, . . . N.

The receive subsystem 218 includes a plurality of sensing amplifiers 220 electrically coupled to the plurality of columns 208. The plurality of sensing amplifiers 220 are configured to receive drive signals applied to the row electrodes 206 via the column electrodes 208. In one example, the receive subsystem 218 may be implemented as a micro-coded state machine. However, numerous types of receive circuitry may be contemplated.

In the depicted example, the drive subsystem 210 applies a drive signal to each row 206 in sequence. During a period in which the sensory surface 204 is untouched, none of the column amplifiers registers an above-threshold output. However, when the user places touch input source (e.g., a fingertip, an active stylus) on or near the sensory surface 204 at a touch point 222, the touch input source capacitively couples one or more rows 206 intersecting the touch point 222 to one or more columns 208 also intersecting the touch point 222. The capacitive coupling induces an above-threshold signal from the column amplifiers 220 associated with the column electrodes 208 beneath (i.e., adjacent) the touch point 222, which provides sensing of the touch point 222. The receive subsystem 218 returns, as the X coordinate of the touch point, the numeric value of the column providing the greatest signal. The receive subsystem 218 also determines which row was being excited when the greatest signal was received, and returns the numeric value of that row as the Y coordinate of the touch point 222.

In the above description, touch inputs are identified when a given column signal goes "above threshold." Typically this determination is made in the context of a correlation operation. In many implementations, there is a design-time determination made as to the exact character (amplitude, frequency, etc.) of a signal that will be received into the column receive circuitry in the event of a touch. In addition, predictions may be made about the likely noise that will also be received into the column receive circuitry at runtime (e.g., noise from power supply operation, operation of the LCD panel, etc.).

Being thus equipped with a fairly accurate approximation of what a touch-induced inbound signal looks like in the presence of predicted noise, the receive circuitry, in the event of an arbitrary inbound signal received at runtime, can run a correlation operation on that inbound signal, which essentially assesses the degree to which the inbound signal resembles what would be expected in the event of a touch. The correlation operation is "tuned" to account for the drive signal being used to excite the rows, in the sense that it typically uses a reference signal for the correlation that is based upon that drive signal (in some cases, the reference signal is identical to the drive signal). In any event, when the resemblance exceeds a threshold (i.e., the inbound signal highly correlates with what would be expected in the event of a finger touch), then the system affirmatively registers a touch occurring on that column. And as indicated above, the time at which it is received indicates the Y coordinate of the touch. It will be further appreciated that interpolation may be performed on both the X and Y coordinates to increase resolution.

Other measurements may be performed on electrode matrix 202 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

Electrode matrix 202 may be repeatedly scanned at a frame rate (e.g., 60 Hz, 120 Hz) to persistently detect touch input, where a complete scan of a frame comprises applying an excitation sequence to each row 206, and for each driven row, collecting output from all of the receive columns 208. However, in other examples, a complete scan of a frame may be a scan of a desired subset, and not all, of one or both of rows 206 and columns 208.

As discussed above, a touch-sensitive display device may be configured to communicate with an active stylus via a touch sensor of the touch display device. Specifically, an electrostatic channel may be established between one or more rows 206 and a conductive element (e.g., a stylus electrode) of an active stylus, along which data may be transmitted. In one example, communication via the electrostatic channel is initiated by the transmission of a synchronization waveform on one or more electrodes of the electrode matrix 202 to the active input device. The synchronization pattern may enable the touch-sensitive display device and the active stylus to obtain a shared sense of time. The synchronization pattern may be transmitted via multiple transmit rows 206 so that the active input device can receive the pattern regardless of its position relative to the electrode matrix 202. Such synchronization may be referred to as display-initiated synchronization because the touch-sensitive display device transmits or broadcasts the synchronization waveform to initiate synchronization between the touch-sensitive display device and the active stylus.

The shared sense of time may facilitate the correlation of a time at which the active stylus detects an excitation sequence or other signal transmitted on transmit rows 206 to a location in the electrode matrix 202, as the synchronization pattern may yield an indication of the order in which transmit rows 206 are driven. Such correlation may enable the active stylus to determine at least one coordinate (e.g., y-coordinate) relative to the electrode matrix 202, which may be transmitted back to the touch sensor 200 (e.g., via the electrostatic channel) or to an associated display device via a different communication protocol (e.g., radio, Bluetooth). To determine a second coordinate (e.g., x-coordinate) of the active stylus, all transmit rows 206 may be held at a constant voltage, and the active stylus may transmit a time-varying voltage to the electrode matrix 202, which may sequentially measure currents resulting from a voltage of the active input device in each receive column 208 to ascertain the second coordinate.

The above described synchronization, row-drive, and input device-drive operations may be part of a touch sensing frame that is repeated by the touch display device. In particular, the touch sensing frame is divided into a plurality of subframes. In one example, the plurality of subframes include a synchronization subframe, a row-drive subframe, and an input device-drive frame. In some implementations, the input device-drive frame may be further divided into a plurality of designated slots that can be assigned to different paired active input devices. In one example, the input-device drive frame is divide into three slots that can be associated with three different active input devices. In other implementations, the touch sensing frame may be divided differently and/or may include additional subframes. The touch-sensing frame may be defined by the communication protocol that is used by the touch-sensitive display device. Moreover, different communication protocols may define different touch-sensing frames with different arrangements (e.g., total frame duration/frame rate, number of time slots, duration of each time slot, information sent during which time slots).

Figure 3:
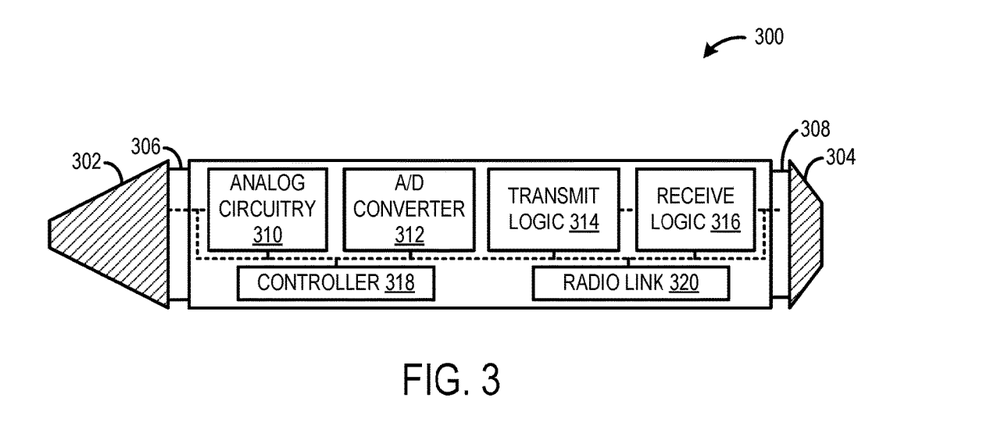
FIG. 3 shows an active stylus.

FIG. 3 shows an example active input device in the form of an active stylus 300. The active stylus 300 is schematically shown in simplified form. The active stylus 300 includes a stylus electrode 302 on one end and an eraser electrode 304 on an opposing end. The stylus electrode 302 and the eraser electrode 304 may be electrically conductive and configured to receive current when proximate to a driven electrode, such as one or more electrodes of the touch sensor 200 of FIG. 2. In other words, the electrodes 302 and 304 are configured to electrostatically couple with one or more electrodes of a capacitance-based touch sensor of a display device. The electrodes 302 and 304 are further configured to electrostatically interact with the touch sensor to enable the display device to determine the position of the active stylus relative to the touch sensor through such electrostatic coupling. The stylus electrode 302 is operatively coupled to a pressure sensor 306 configured to detect a pressure when the stylus electrode 302 is pressed against a surface. Likewise, the eraser electrode 304 is operatively coupled to a pressure sensor 308 configured to detect a pressure when the eraser electrode 304 is pressed against a surface. In one example, each of the pressure sensors 306 and 308 are force sensitive resistors. A touch pressure value of each of the respective pressure sensors 306 and 308 may be sent to a controller 318.

As shown, the stylus electrode 302 and the eraser electrode 304 are operatively coupled to analog circuitry 310. The analog circuitry 310 may include linear analog componentry configured to maintain the electrodes at a constant voltage and convert any current into or out of the electrodes into a proportional current-sense voltage.

An analog-to-digital (A/D) converter 312 is operatively coupled to the analog circuitry 310 and configured to digitize voltages received from the analog circuitry 310 into digital data to facilitate subsequent processing. As a non-limiting example, the A/D converter 312 may convert incoming electrostatic signals having bandwidths of 100 kHz at a sampling rate of 1 Mbit/s.

Transmit logic 314 is configured to drive the stylus electrode 302 or the eraser electrode 304 with a synchronization waveform when the active stylus 300 is operating in the stylus-initiated synchronization mode. The synchronization waveform may be alternatively referred to as a synchronization beacon signal. When the synchronization waveform is electrostatically received and processed at a touch-sensitive display device supporting this stylus-initiated synchronization mode, the processed waveform enables the touch-sensitive display device to adjust a timing in order to become time synchronized with the active stylus 300.

Receive logic 316 is configured to process received waveforms on the stylus electrode that are influenced by synchronization waveforms being driven on one or more electrodes of other device types, i.e., touch-sensitive displays employing the display-initiated synchronization mode. Typically, processing in the receive logic 316 involves correlation operations, the outputs of which are used to enable the active stylus 300 to become synchronized with the touch-sensitive display device, thereby causing the active stylus 300 and the touch-sensitive display device to have a shared sense of time.

The controller 318 is configured to perform various operations discussed herein. For example, the controller 318 may be configured to receive signals from various sensors including pressure sensors 306 and 308. Further, the controller 318 may be configured to process digitized signals from A/D converter 312 as well as transmit logic 314 and receive logic 316 to perform other operations discussed herein.

The controller 318 is configured to cause the active stylus to switch between synchronization modes in response to detecting various operating conditions. For example, the controller 318 may be configured to switch the active stylus 300 from operation in the stylus-initiated synchronization mode to operation in the display-initiated synchronization mode based on detection of an operating condition.

In one example, the condition includes, while operating in the stylus-initiated synchronization mode, receiving a synchronization waveform from a touch-sensitive display device that supports the display-initiated mode. In particular, when the active stylus 300 is in the stylus-initiated synchronization mode, and is not transmitting a stylus-initiated synchronization waveform or other signal, the controller 318 turns on a receiving path to detect a display-initiated synchronization waveform from a display device (e.g., correlate a received electrostatic signal against the known display-initiated synchronization waveform). If the display-initiated synchronization waveform is detected (e.g., the correlation result is above a designated threshold), the controller 318 causes the active stylus 300 to switch to display-initiated synchronization mode and adjust a timing based on the synchronization waveform to enable the active stylus 300 to become time synchronized with the respective display device that is using display-initiated synchronization.

In another example, the condition includes, while operating in the stylus-initiated synchronization mode, determining that the active stylus 300 is less than a threshold distance from a display device using display-initiated synchronization. In particular, the controller 318 is configured to determine a signal strength of a signal received from a display device by the active stylus 300. The controller 318 is further configured to derive a distance between the active stylus 300 and the display device based on the determined signal strength. If the distance is less than a threshold distance, then the controller 318 determines that the active stylus 300 is within range of the display device and switches to the display-initiated synchronization mode.

Furthermore, the controller 318 may be configured to cause the active stylus 300 to switch from display-initiated synchronization to stylus-initiated synchronization based on detection of a different operating condition. In one example, the condition includes, while operating in the display-initiated synchronization mode, determining that the active stylus is greater than a threshold distance from a display device using display-initiated synchronization (i.e., the stylus is withdraw from the display devices that uses display-based synchronization).

In another example, detecting the condition includes not receiving an expected response (e.g., a synchronization waveform) on the stylus electrode 302 or the eraser electrode 304 from the display device for greater than a threshold duration. When the active stylus 300 switches back to operation in the stylus-initiated synchronization mode, the transmit logic 314 begins transmitting the stylus-initiated synchronization waveform according to the communication protocol of the stylus-initiated synchronization mode.

In some implementations, the display-initiated synchronization waveform is different than the waveforms driven on the one or more electrodes of the touch-sensitive display device that uses a stylus-initiated communication protocol. By using different waveforms, the active stylus 300 may be prevented from improperly switching between synchronization modes upon receiving a synchronization waveform from a display device to maintain synchronization.

In some implementations, the stylus-initiated synchronization mode may be employed as a default mode of operation of the active stylus 300. Further, when operating in the stylus-initiated synchronization mode and not transmitting, the active stylus 300 can listen for the presence of a display device that uses display-initiated synchronization, in order to potentially switch from stylus-initiated to display-initiated mode. Specifically, the stylus can listen for a synchronization waveform from a device using display-initiated synchronization and/or determine that the active stylus 300 is less than a threshold distance from such a display device. In response to either of these conditions, the controller 318 switches the active stylus 300 to operation in the display-initiated synchronization mode. When the controller 318 operates the active stylus 300 in the display-initiated synchronization mode, the transmit logic 314 is configured to not drive the stylus electrode 302 or the eraser electrode 304 with the stylus-initiated synchronization waveform (i.e., the stylus does not initiate synchronization). When the controller 318 detects a condition, such as when the active stylus 300 moves away from the display device that was time synchronized with display-initiated synchronization, the active stylus 300 returns to operating in the default stylus-initiated synchronization mode.

In some implementations, the controller 318 may be configured to recognize different display-initiated synchronization waveforms from a plurality of different touch-sensitive display devices. The different display-initiated synchronization waveforms may be defined by different communication protocols. In some implementations, the different display-initiated synchronization waveforms may be orthogonal to each other, so that the stylus may unambiguously detect any one of them. Further, the receive logic 316 may be configured to enable the active stylus 300 to become time synchronized with any of a plurality of touch interactive display devices. This synchronization may be achieved by interpreting different responses on the electrodes 302/304 (e.g., with multiple different correlation operations) caused by the different synchronization waveforms associated with the different display devices.

In some implementations, the active stylus 300 may include a plurality of electrodes, and the transmit logic 314 may be configured to drive one or more of those electrodes with the stylus-initiated synchronization waveform, and the receive logic 316 may be configured to sense responses on one or more of the stylus electrodes due to display initiated synchronization waveforms. In other words, by having a plurality of independently controllable electrodes, the active stylus 300 may operate in both the stylus-initiated synchronization mode and the display-initiated synchronization mode simultaneously.

The active stylus 300 may operate in conjunction with a time synchronized touch-sensitive display device based on different communication protocols. Operation according to one such communication protocol is now described. In particular, the receive logic 316 is configured to (1) establish/maintain a shared sense of time (display-initiated synchronization); and (2) to establish a Y coordinate of the active stylus 300 with respect to a touch-sensor matrix (or the X coordinate in the event of vertically-oriented rows) of the display device. Synchronization typically occurs at the beginning of a touch-sensing frame, in which one or more rows on the touch-sensor matrix are driven with a synchronization waveform that induce/vary electrical conditions on the electrodes 302/304. The received signal is processed, typically via a correlation operation, in order to establish/maintain the shared sense of timing. Usually, multiple rows, spanning the entire height/width of the touch-sensor matrix, are driven with the synchronization pulse so that active stylus 300 receives an adequate signal regardless of its position relative to the touch-sensor matrix.

As rows are scanned on the touch sensor, receive circuitry on the touch sensor may be used to conduct capacitance measurements of finger touch. During such row drive, listening may also be employed at the stylus electrodes 302/304 to determine stylus position. Specifically, receive logic 316 and/or controller 318 may run correlations to sense conditions on the electrodes corresponding to drive signals on the rows of the touch sensor. Upon receiving a signal of greatest amplitude (e.g., highest correlation), the controller 318 makes a note of the timing of that highest signal. The recorded timing allows determination of which row the active stylus 300 was closest to, thereby establishing the Y position. In some examples, the position maybe calculated locally on the stylus. In other examples, the active stylus 300 reports row position information (e.g., timing, value of a row counter) via a wireless link (e.g., a radio transmitter) 320. Instead of or in addition to the radio link 320, row position information may be transmitted electrostatically via excitation of the electrodes 302/304.

In some implementations, interpolation may be employed to increase positional resolution. For example, assuming a highest amplitude at row K, amplitudes may also be noted for rows K−2, K−1, K+1, K+2. Assessing the amplitudes for these neighboring rows can enable finer determinations of Y position. Essentially, the active stylus 300 "listens" for a communication from rows, and based on the "loudness" of that communication, an assessment is made as to how close active stylus 300 is to the row that is "talking." By assessing communication volume from a few rows on either side of the "loudest" row, a higher position granularity may be determined.

In addition to the receive logic 316 receiving signals during a "sync subframe" and during a "row-drive" subframe, the transmit logic 314 is configured to drive the electrodes 302/304 during a "stylus-drive" subframe. In this case, application of a drive signal to the electrode 302/304 influences/varies electrical conditions on one or more column electrodes of the touch-sensor matrix of the touch-sensitive display device. The column receive circuitry correlates, as described above, in order to interpret the received signals. The column experiencing the highest signal, or an above-threshold signal, is deduced to be the column that the active stylus 300 is closest to, thereby establishing the X position of the active stylus 300. And as with the Y determination, the conditions at a clustered grouping of columns may be used to establish a higher positional resolution.

Figure 4:
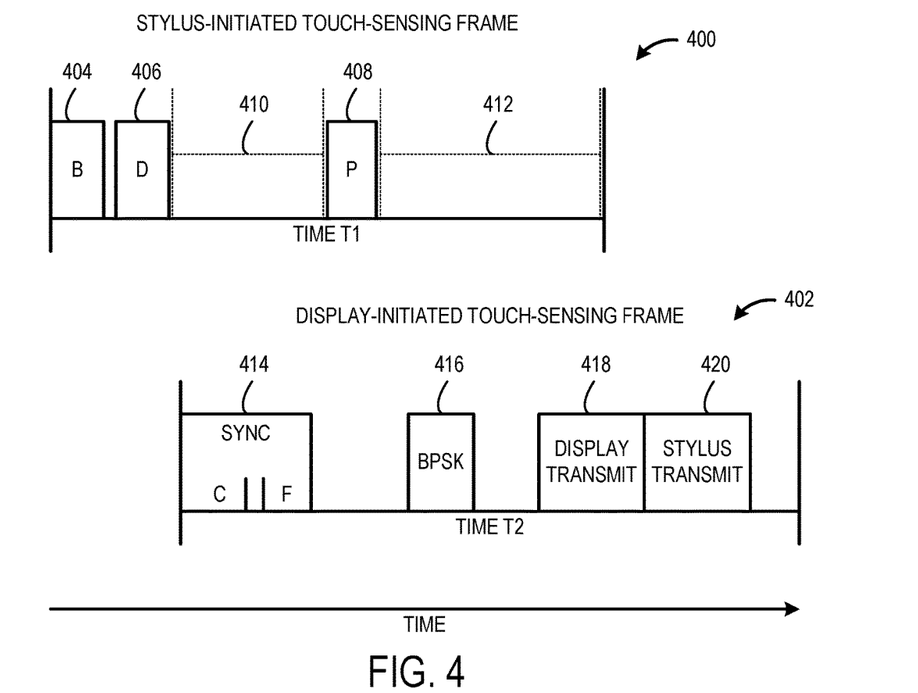
FIG. 4 shows different touch-sensing frames of different stylus-display communication protocols.

As discussed above, different communication protocols may define different touch-sensing frames that may be used by the active stylus 300 to communication with different touch-sensitive display devices. FIG. 4 shows a stylus-initiated touch-sensing frame 400 and a display-initiated touch-sensing frame 402. The stylus-initiated touch-sensing frame 400 is for use with display devices that synchronize styluses (stylus-initiated synchronization mode), while the display-initiated touch-sensing frame 402 is for use with display devices that cause styluses to be synchronized to them (display-initiated synchronization mode).

The stylus-initiated touch-sensing frame 400 includes a beacon portion 404, a data portion 406, and a pressure portion 408. During the beacon portion 404, the active stylus transmits a stylus-initiated synchronization waveform that may be received by a touch-sensitive display device. The touch-sensitive display device may use the stylus-initiated synchronization waveform to establish a shared sense of time and/or determine a position of the stylus. During the data portion 406, the active stylus transmits digital data to the touch-sensitive display device. For example, such digital data may include button status information, stylus ID, and battery status information. During the pressure portion 408, the active stylus transmits pressure information of the active stylus to the touch-sensitive display device.

The stylus-initiated touch-sensing frame 400 has a duration of time (T1). In one example, the duration (T1) is ~15.014 milliseconds, and the different transmit portions 404, 406, and 408 have a duration of 1.2817 milliseconds. This example is meant to be non-limiting and the frame and/or the transmit portions 404, 406, and 408 of the frame 400 may be of any suitable duration. In between the transmit portions 404, 406, and 408 of the stylus-initiated touch-sensing frame 400, the active stylus may be configured so as to not transmit any signals. As such, in detection portions 410 and 412, the receive logic of the active stylus may turn on a receiving path and "listen" for the display-initiated synchronization waveform. In other words, detection portions 410 and 412 allow an opportunity for the stylus to detect the presence of a display that uses display-initiated synchronization, and potentially become synchronized to it.

Furthermore, when the active stylus is hovering (e.g., the pressure sensors detect no pressure), the pressure portion and potentially the data portion may be omitted. In other words, during the duration between the beacon portion of the $N^{th}$ frame and the beacon portion of the $(N+1)^{th}$ frame, the active Stylus is transmitting less, which may increase the duration in which the active stylus may "listen" for a display-initiated synchronization waveform.

FIG. 4 shows a touch-sensing frame which may be used with display devices that uses display-initiated synchronization. Specifically, the display-initiated touch-sensing frame 402 includes a synchronization portion 414, a phase-shift keying portion 416, a display-transmit portion 418, and a stylus-transmit portion 420. During the synchronization portion 414, the display device transmits the display-initiated synchronization waveform that may be used by the active stylus to synchronize itself to the display. During the phase-shift keying portion 416, the display device transmits one or more bits of information (e.g., BPSK) using a modulation scheme that permits the information to be reliably transmitted through the channel to the active stylus. During the display-transmit portion 418, the touch-sensitive display device excites rows or columns in order to determine a position of the active stylus (and finger touch). During the stylus-transmit portion 420, the active stylus drives its electrodes to enable the display to sense its position (e.g., X coordinate). The display-initiated touch-sensing frame 402 has a duration of time (T2) that is different than the duration (T1) of the stylus-initiated touch-sensing frame 400. In one example, the duration (T2) is ~8.33 milliseconds.

Due to the different frame durations/frame rates of the stylus-initiated touch-sensing frame 400 and the display-initiated touch-sensing frame 402, and due to the length and spacing of the sub-frame intervals in which electrodes are driven and silent/listening, the active stylus may be able to receive the display-initiated synchronization waveform, and use it to achieve synchronization, within a designated number of frames (N) upon being within a threshold distance of the touch-sensitive display device. The number of frames (N) may be based on the above frame characteristics (frame durations/rates, length and spacing of sub-frame intervals, etc.). For example, the structure of display-initiated touch-sensing frame 402 and stylus-initiated touch-sensing frame 400 may ensure that, regardless of the alignment of frames 400 and 402 when a stylus approaches a display using display-initiated synchronization, the synchronization waveform of device-initiated touch-sensing frame 402 will coincide with a listening portion on the other frame (e.g., detection portion 410 and/or 412 of touch frame 400). In some implementations, this is achieved by using knowledge of one type of touch frame in order to construct the other.

The stylus-initiated touch-sensing frame and the display-initiated touch-sensing frame 400/402 are provided as non-limiting examples, and a variety of differently-constructed touch-sensing frames may be employed. For example, the touch-sensing frames may have different frame durations, frame rates, sub-intervals for different operations/transmissions, etc.

Figure 5:
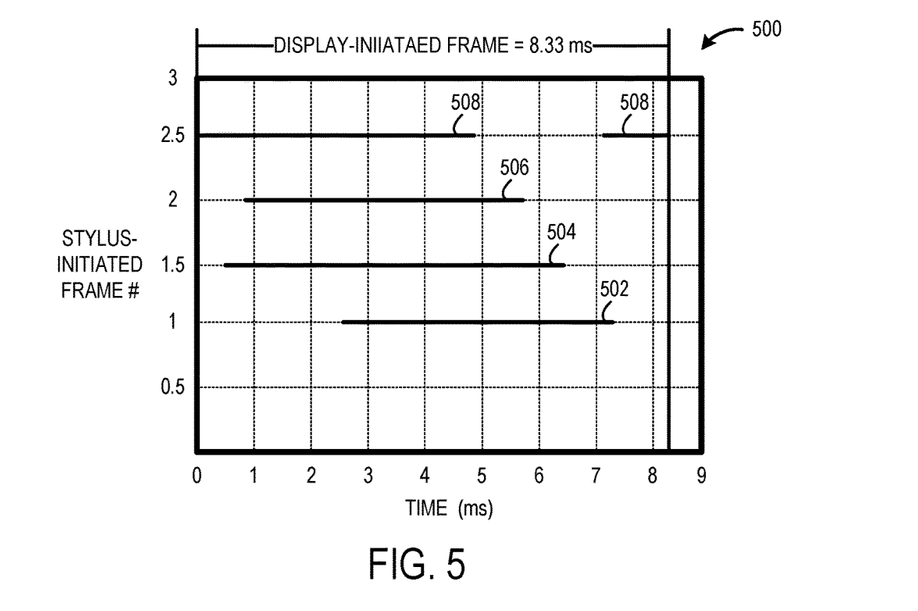
FIG. 5 shows a graph depicting a scenario in which an entire device-initiated touch-sensing frame is detected during different detection portions of a plurality of stylus-initiated touch-sensing frames.

FIG. 5 shows a graph 500 depicting a scenario in which an entire device-initiated touch-sensing frame is detected during different detection portions of a plurality of stylus-initiated touch-sensing frames. The device-initiated touch sensing frame and the stylus-initiated touch-sensing frame are arranged in the same manner as the touch-sensing frames of FIG. 4. In particular, the stylus-initiated touch-sensing frame has a duration of 15.04 milliseconds (ms) and includes two display-initiated beacon detection portions. The first detection portion start at 2.58 ms and ends at 7.5 ms of the stylus-initiated touch-sensing frame (e.g., corresponding to 410 of FIG. 4). The second detection portion starts at 8.78 ms and ends at 15.014 ms of the stylus-initiated touch sensing frame (e.g., corresponding to 412 of FIG. 4).

The graph 500 plots time (ms) vs a number of stylus-initiated touch-sensing frames. The depicted time period, which is 0-9 ms, encompasses the entire duration of the device-initiated touch-sensing frame (e.g., 8.33 ms). The graph 500 depicts different detection portions of multiple touch-sensing frames folded over this time period. In particular, the graph 500 indicates how the different detection periods overlap the entire duration of the device-initiated touch-sensing frame to enable the device-initiated touch-sensing frame to be received during the different detection periods over the course of multiple frames.

A first detection portion 502 of a first stylus-initiated touch-sensing frame overlaps a portion of the display-initiated touch-sensing frame that spans from 2.58 ms to 7.5 ms. A second detection period 504 of the first stylus-initiated touch-sensing frame overlaps a portion of the display-initiated touch-sensing frame that spans from 0.45 ms to 6.68 ms. Further, a first detection portion of a second stylus-initiated touch-sensing frame overlaps a portion of the display-initiated touch-sensing frame that spans from 0.93 ms to 5.85 ms of the display-initiated touch-sensing frame. A second detection portion of the second stylus-initiated touch-sensing frame overlaps a portion of the display-initiated touch-sensing frame that spans from 7.14 ms to 8.33 ms and the second portion 508 wraps around to overlap from 0 ms to 5.02 ms of the display-initiated touch-sensing frame. The detection portions 502-508 that occur during two stylus-initiated touch-sensing frames collectively overlap the entire duration of the display-initiated touch sensing frame. In this way, the display-initiated touch sensing frame may be received by an active stylus operating in stylus-initiated synchronization mode.

The configurations described above enable various methods for operating an active stylus to synchronize with different touch-sensitive display devices using different communication protocols. Accordingly, some such methods are now described, by way of example, with continued reference to the above configurations. It will be understood, however, that these methods, and others fully within the scope of the present disclosure, may be enabled via alternate configurations.

Figure 6:
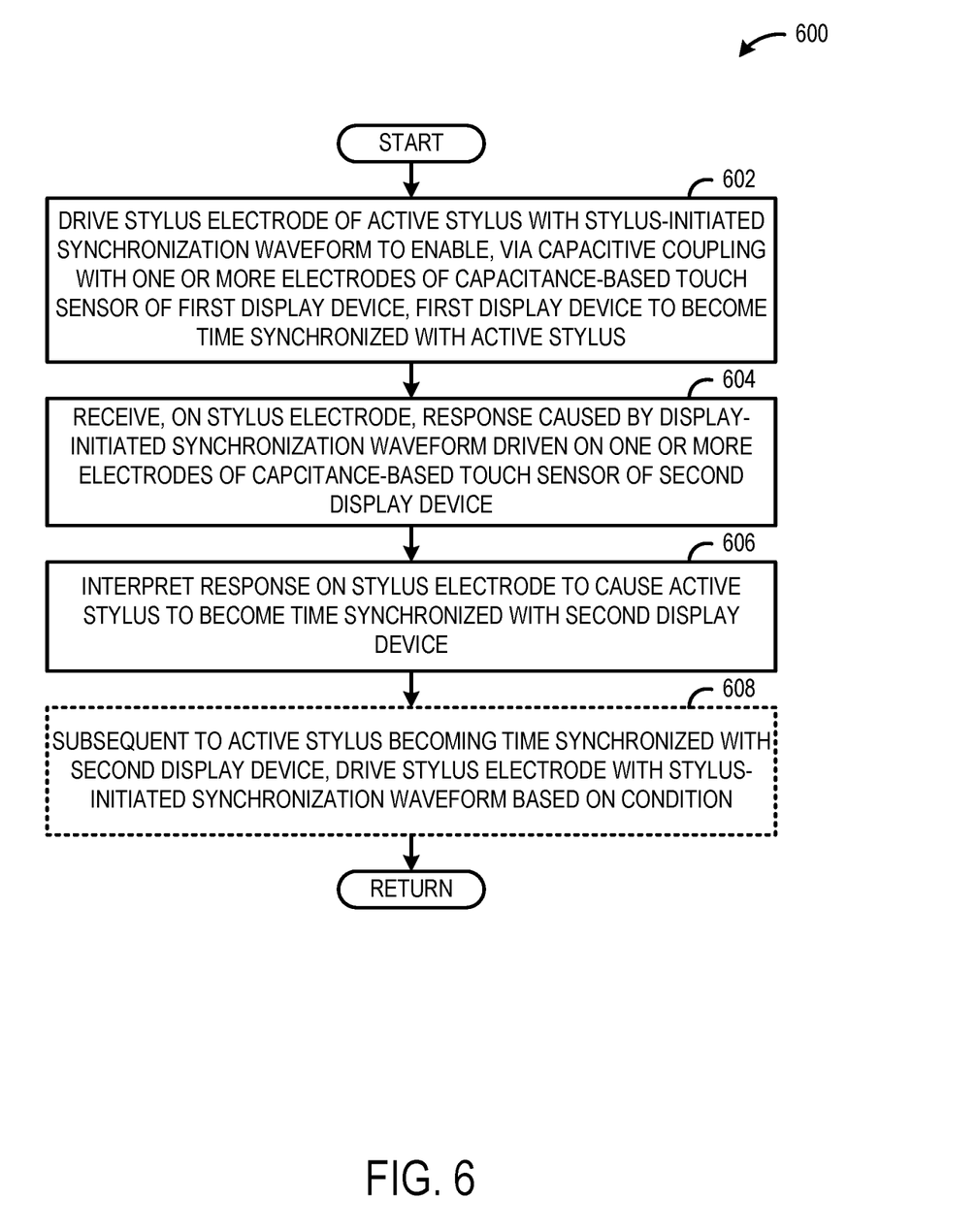
FIG. 6 shows a method for operating an active stylus.

FIG. 6 shows an example method 600 for operating an active touch input device to interact with multiple interactive touch display devices. For example, the method may be performed by the active stylus 104 of FIGS. 1A and 1B and the active stylus 300 of FIG. 3.

At 602, the method 600 includes driving a stylus electrode of an active stylus with a stylus-initiated synchronization waveform. The stylus-initiated synchronization waveform is configured to enable, via capacitive coupling with one or more electrodes of a capacitance-based touch sensor of a first display device, the first display device to become time synchronized with the active stylus. For example, the stylus electrode may be driven with the stylus-initiated synchronization waveform when the active stylus is operating in the stylus-initiated synchronization mode. In some implementations, the stylus-initiated synchronization mode may be a default mode of operation of the active stylus.

At 604, the method 600 includes receiving, on the stylus electrode, a response caused by a display-initiated synchronization waveform driven on one or more electrodes of a capacitance-based touch sensor of a second, different display device. For example, the response may be received, while the stylus is in the stylus-initiated synchronization mode, during portions of the stylus's touch-sensing frame when the stylus electrode is not being used for transmission. The display-initiated synchronization waveform may be different than the waveforms driven on the one or more electrodes of the touch-sensitive display device in stylus-initiated synchronization mode. The stylus-initiated synchronization waveform may be driven on the stylus electrode as part of a first repeated touch-sensing frame. The display-initiated synchronization waveform may be driven on the one or more electrodes of the second display device as part of a second repeated touch-sensing frame that is arranged differently than the first touch-sensing frame.

The different arrangement of the touch-sensing frames, as discussed above, is to ensure that the active stylus can receive the display-initiated synchronization waveform from the second display device. For example, the different touch-sensing frames may have different durations such that transmission of the relevant synchronization waveform will overlap with an associated receiving portion of the other touch-sensing frame within a certain number of frames. For example, a first touch-sensing frame may be constructed using knowledge of another, second touch-sensing frame, to ensure that, regardless of frame-to-frame alignment, a receiving portion of the first touch-sensing frame coincides within a set time (e.g., N frames) with transmission of a synchronization waveform from the second touch-sensing frame.

At 606, the method 600 includes interpreting the response on the stylus electrode to cause the active stylus to become time synchronized with the second display device. In response to receiving and interpreting the display-initiated synchronization waveform, the active stylus may switch to operation in the display-initiated synchronization mode. While operating in the display-initiated synchronization mode, the active stylus does not transmit the stylus-initiated synchronization waveform for as long as the active stylus receives an expected response (e.g., display-initiated synchronization waveform, position information) from the second display device.

In some implementations, at 608, the method optionally may include, subsequent to the active stylus being synchronized with the second display device, driving the stylus electrode with the stylus-initiated synchronization waveform based on a condition (i.e., returning to stylus-initiated synchronization mode based on a condition). In one example, the condition includes not receiving an expected response on the stylus electrode from the second display device for greater than a threshold duration. In other words, the stylus does not switch into stylus-initiated mode until a threshold time has passed in which the stylus has not received an expected response from the display device that uses display-initiated synchronization. In this example, exceeding the threshold time may correspond to the active stylus moving out of range of the second display device. Accordingly, the active stylus reverts back to operation in the stylus-initiated synchronization mode.

By operating in different synchronization modes that use different synchronization waveforms defined by different communication protocols, the active stylus can synchronize and interact with different touch-sensitive display devices that use the different communication protocols. In other words, the active stylus can be used to interact with different display devices even if the display devices use different communication protocols.

In some implementations, the methods and processes described herein may be tied to a computing system of one or more computing devices. In particular, such methods and processes may be implemented as a computer-application program or service, an application-programming interface (API), a library, and/or other computer-program product.

Figure 7:
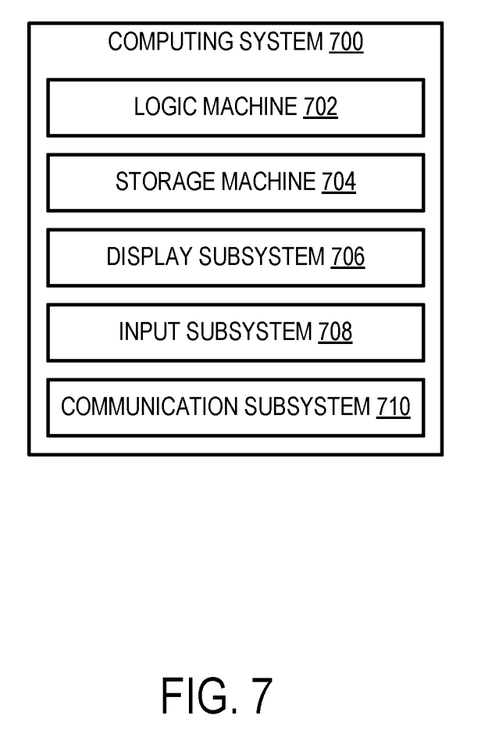
FIG. 7 shows a computing system.

FIG. 7 schematically shows a non-limiting implementation of a computing system 700 that can enact one or more of the methods and processes described above. Computing system 700 is shown in simplified form. Computing system 700 may take the form of one or more display devices, active styluses, personal computers, server computers, tablet computers, home-entertainment computers, network computing devices, gaming devices, mobile computing devices, mobile communication devices (e.g., smart phone), and/or other computing devices. For example, computing system 700 may represent the active stylus 104 of FIG. 1, the touch-sensitive display devices 106 and 108 of FIGS. 1A and 1B, and the active stylus 300 of FIG. 3.

Computing system 700 includes a logic machine 702 and a storage machine 704. Computing system 700 may optionally include a display subsystem 706, input subsystem 708, communication subsystem 710, and/or other components not shown in FIG. 700.

Logic machine 702 includes one or more physical devices configured to execute instructions. For example, logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 702 may include one or more processors configured to execute software instructions. Additionally or alternatively, Logic machine 702 may include one or more hardware or firmware logic machines configured to execute hardware or firmware instructions. Processors of logic machine 702 may be single-core or multi-core, and the instructions executed thereon may be configured for sequential, parallel, and/or distributed processing. Individual components of logic machine 702 optionally may be distributed among two or more separate devices, which may be remotely located and/or configured for coordinated processing. Aspects of logic machine 702 may be virtualized and executed by remotely accessible, networked computing devices configured in a cloud-computing configuration.

Storage machine 704 includes one or more physical devices configured to hold instructions executable by logic machine 702 to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc), semiconductor memory (e.g., RAM, EPROM. EEPROM), and/or magnetic memory (e.g., hard-disk drive, floppy-disk drive, tape drive, MRAM), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of a graphical user interface (GUI). As the herein described methods and processes change the data held by storage machine 704, and thus transform the state of storage machine 704, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, communication subsystem 710 may be configured for communication via a wireless telephone network, or a wired or wireless local- or wide-area network. In some embodiments, communication subsystem 710 may allow computing system 700 to send and/or receive messages to and/or from other devices via a network such as the Internet.

In an example, an active stylus for use with one or more touch-sensitive display devices, comprises a stylus electrode configured to electrostatically couple with one or more electrodes of a display device having a capacitance-based touch sensor, transmit logic configured to drive the stylus electrode with a synchronization waveform that is configured, via interpreting a response on one or more electrodes of a first display device, to enable the first display device to become time synchronized with the active stylus, this mechanism of synchronization being referred to as a stylus-initiated synchronization mode, receive logic configured to interpret a response on the stylus electrode caused by a synchronization waveform being driven on one or more electrodes of a second display device, such interpretation configured to enable the active stylus to become time synchronized with the second display device, this mechanism of synchronization being referred to as a display-initiated synchronization mode, and a controller configured, in response to detection of a condition, to cause the active stylus to switch from one of the synchronization modes to the other. In this example and/or other examples, detecting the condition may include, while operating in the stylus-initiated synchronization mode, receiving a synchronization waveform from the second display device. In this example and/or other examples, detecting the condition may include, while operating in the stylus-initiated synchronization mode, determining that the active stylus is less than a threshold distance from the second display device. In this example and/or other examples, detecting the condition may include, while operating in the display-initiated synchronization mode, determining that the active stylus is greater than a threshold distance from the second display device. In this example and/or other examples, the stylus-initiated synchronization mode may be a default mode of operation of the active stylus, and the controller may be configured to cause the active stylus to switch to operation in the display-initiated synchronization mode in response to receiving a synchronization waveform from the second display device or determining that the active stylus is less than a threshold distance from the second display device. In this example and/or other examples, the active stylus may be configured to not drive the stylus electrode with the synchronization waveform of the stylus-initiated synchronization mode while operating in the display-initiated synchronization mode. In this example and/or other examples, the synchronization waveform driven on the one or more electrodes of the second display device in the display-initiated synchronization mode may be different than the waveforms driven on the one or more electrodes of the first display device in stylus-initiated synchronization mode. In this example and/or other examples, the synchronization waveform driven on the stylus electrode in the stylus-initiated synchronization mode may be driven as part of a first repeated touch-sensing frame and the synchronization waveform driven on the one or more electrodes of the second display device in the display-initiated synchronization mode may be driven as part of a second repeated touch-sensing frame that is arranged differently than the first touch-sensing frame to ensure that the active stylus can receive the synchronization waveform from the second display device when the active stylus is in the stylus-initiated synchronization mode. In this example and/or other examples, the receive logic may be configured to interpret the response on the stylus electrode caused by the synchronization waveform being driven on one or more electrodes of the second display device, when the stylus electrode is not being driven by the transmit logic. In this example and/or other examples, the receive logic may be configured to enable the active stylus to become time synchronized with any of a plurality of display devices having capacitance-based touch sensors by interpreting different responses on the stylus electrode caused by different synchronization waveforms corresponding to different ones of the plurality of different display devices.

In an example, a method for operating an active stylus for use with one or more touch-sensitive display devices, the method comprises driving a stylus electrode of the active stylus with a stylus-initiated synchronization waveform, the stylus-initiated synchronization waveform being configured to enable, via capacitive coupling with one or more electrodes of a capacitance-based touch sensor of a first display device, the first display device to become time synchronized with the active stylus, such synchronization mechanism being referred to as a stylus-initiated synchronization mode, receiving, on the stylus electrode, a response caused by a display-initiated synchronization waveform driven on one or more electrodes of a capacitance-based touch sensor of a second display device, and interpreting the response on the stylus electrode to cause the active stylus to become time synchronized with the second display device, such synchronization mechanism being referred to as a display-initiated synchronization mode. In this example and/or other examples, the method may further comprise subsequent to the active stylus becoming time synchronized with the second display device, driving the stylus electrode with the stylus-initiated synchronization waveform based on detection of a condition. In this example and/or other examples, detecting the condition may include not receiving an expected response on the stylus electrode from the second display device for greater than a threshold duration. In this example and/or other examples, the stylus electrode may be not driven by the stylus-initiated synchronization waveform while the active stylus is time synchronized with the second display device if the expected response is received on the stylus electrode from the second display device within the threshold duration. In this example and/or other examples, the response from the second display device may be received on the stylus electrode when the stylus electrode is not being driven by the stylus transmit logic. In this example and/or other examples, the stylus-initiated synchronization waveform may be driven on the stylus electrode as part of a first repeated touch-sensing frame, the display-initiated synchronization waveform may be driven on the one or more electrodes of the second display device as part of a second repeated touch-sensing frame, and the stylus-initiated synchronization waveform and the display-initiated synchronization waveform may be arranged differently to ensure that the active stylus can receive the display-initiated synchronization waveform from the second display device.

In an example, an active stylus for use with one or more touch-sensitive display devices, comprises a stylus electrode configured to electrostatically couple with one or more electrodes of a display device having a capacitance-based touch sensor, transmit logic configured to drive the stylus electrode with a synchronization waveform that is configured, via interpreting a response on one or more electrodes of a first display device, to enable the first display device to become time synchronized with the active stylus, this mechanism of synchronization being referred to as a stylus-initiated synchronization mode, receive logic configured to interpret a response on the stylus electrode caused by a synchronization waveform being driven on one or more electrodes of a second display device, such interpretation configured to enable the active stylus to become time synchronized with the second display device, this mechanism of synchronization being referred to as a display-initiated synchronization mode, and a controller configured to cause the active stylus to operate in the stylus-initiated synchronization mode as a default mode of operation of the active stylus, and wherein the controller is configured to cause the active stylus to switch to operation in the display-initiated synchronization mode in response to receiving a synchronization waveform from the second display device or determining that active stylus is less than a threshold distance from the second display device. In this example and/or other examples, the transmit logic may be configured to not drive the stylus electrode with the synchronization waveform of the stylus-initiated synchronization mode while operating in the display-initiated synchronization mode. In this example and/or other examples, the controller may be configured, subsequent to the active stylus becoming time synchronized with the second display device, to cause the active stylus to switch to operation in the stylus-initiated synchronization mode in which the stylus electrode is driven with the stylus-initiated synchronization waveform based on the transmit logic not receiving an expected response on the stylus electrode from the second display device for greater than a threshold duration. In this example and/or other examples, the synchronization waveform driven on the one or more electrodes of the second display device in the display-initiated synchronization mode may be different than the waveforms driven on the one or more electrodes of the first display device in stylus-initiated synchronization mode.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An active stylus for use with one or more touch-sensitive display devices, comprising:
   a stylus electrode configured to electrostatically couple with one or more electrodes of a display device having a capacitance-based touch sensor;
   transmit logic configured to drive the stylus electrode with a first synchronization waveform that is configured, via interpreting a response on one or more electrodes of a first display device, to enable the first display device to become time synchronized with the active stylus, where the first synchronization waveform is driven on the stylus electrode as part of a first repeated touch-sensing frame, this mechanism of synchronization being referred to as a stylus-initiated synchronization mode;
   receive logic configured to interpret a response on the stylus electrode caused by a second synchronization waveform being driven on one or more electrodes of a second display device, such interpretation configured to enable the active stylus to become time synchronized with the second display device, where the second synchronization waveform is driven on the one or more electrodes of the second display device as part of a second repeated touch-sensing frame that is arranged differently than the first repeated touch-sensing frame, this mechanism of synchronization being referred to as a display-initiated synchronization mode; and a controller configured, in response to detection of a condition, to cause the active stylus to switch from one of the synchronization modes to the other.

2. The active stylus of claim 1, wherein detecting the condition includes, while operating in the stylus-initiated synchronization mode, receiving the second synchronization waveform from the second display device.

3. The active stylus of claim 1, wherein detecting the condition includes, while operating in the stylus-initiated synchronization mode, determining that the active stylus is less than a threshold distance from the second display device.

4. The active stylus of claim 1, wherein detecting the condition includes, while operating in the display-initiated synchronization mode, determining that the active stylus is greater than a threshold distance from the second display device.

5. The active stylus of claim 1, wherein the stylus-initiated synchronization mode is a default mode of operation of the active stylus, and wherein the controller is configured to cause the active stylus to switch to operation in the display-initiated synchronization mode in response to receiving the second synchronization waveform from the second display device or determining that the active stylus is less than a threshold distance from the second display device.

6. The active stylus of claim 5, wherein the active stylus is configured to not drive the stylus electrode with the first synchronization waveform of the stylus-initiated synchronization mode while operating in the display-initiated synchronization mode.

7. The active stylus of claim 1, wherein the second synchronization waveform driven on the one or more electrodes of the second display device in the display-initiated synchronization mode is different than the first synchronization waveform driven on the one or more electrodes of the first display device in stylus-initiated synchronization mode.

8. The active stylus of claim 1, wherein the receive logic is configured to interpret the response on the stylus electrode caused by the second synchronization waveform being driven on one or more electrodes of the second display device, when the stylus electrode is not being driven by the transmit logic.

9. The active stylus of claim 1, wherein the receive logic is configured to enable the active stylus to become time synchronized with any of a plurality of display devices having capacitance-based touch sensors by interpreting different responses on the stylus electrode caused by different synchronization waveforms corresponding to different ones of the plurality of different display devices.

10. A method for operating an active stylus for use with one or more touch-sensitive display devices, the method comprising:

driving a stylus electrode of the active stylus with a stylus-initiated synchronization waveform as part of a first repeated touch-sensing frame, the stylus-initiated synchronization waveform being configured to enable, via capacitive coupling with one or more electrodes of a capacitance-based touch sensor of a first display device, the first display device to become time synchronized with the active stylus, such synchronization mechanism being referred to as a stylus-initiated synchronization mode;

receiving, on the stylus electrode, a response caused by a display-initiated synchronization waveform driven on one or more electrodes of a capacitance-based touch sensor of a second display device as part of a second repeated touch-sensing frame that is arranged differently than the first repeated touch-sensing frame; and interpreting the response on the stylus electrode to cause the active stylus to become time synchronized with the second display device, such synchronization mechanism being referred to as a display-initiated synchronization mode.

11. The method of claim 10, further comprising:

subsequent to the active stylus becoming time synchronized with the second display device, driving the stylus electrode with the stylus-initiated synchronization waveform based on detection of a condition.

12. The method of claim 11, wherein detecting the condition includes not receiving an expected response on the stylus electrode from the second display device for greater than a threshold duration.

13. The method of claim 12, wherein the stylus electrode is not driven by the stylus-initiated synchronization waveform while the active stylus is time synchronized with the second display device if the expected response is received on the stylus electrode from the second display device within the threshold duration.

14. The method of claim 10, wherein the response from the second display device is received on the stylus electrode when the stylus electrode is not being driven with the stylus-initiated synchronization waveform.

15. An active stylus for use with one or more touch-sensitive display devices, comprising:

a stylus electrode configured to electrostatically couple with one or more electrodes of a display device having a capacitance-based touch sensor;

transmit logic configured to drive the stylus electrode with a first synchronization waveform that is configured, via interpreting a response on one or more electrodes of a first display device, to enable the first display device to become time synchronized with the active stylus, where the first synchronization waveform is driven on the stylus electrode as part of a first repeated touch-sensing frame, this mechanism of synchronization being referred to as a stylus-initiated synchronization mode;

receive logic configured to interpret a response on the stylus electrode caused by a second synchronization waveform being driven on one or more electrodes of a second display device, such interpretation configured to enable the active stylus to become time synchronized with the second display device, where the second synchronization waveform is driven on the one or more electrodes of the second display device as part of a second repeated touch-sensing frame that is arranged differently than the first repeated touch-sensing frame, this mechanism of synchronization being referred to as a display-initiated synchronization mode; and a controller configured to cause the active stylus to operate in the stylus-initiated synchronization mode as a default mode of operation of the active stylus, and wherein the controller is configured to cause the active stylus to switch to operation in the display-initiated synchronization mode in response to receiving the second synchronization waveform from the second display device or determining that active stylus is less than a threshold distance from the second display device.

16. The active stylus of claim 15, wherein the transmit logic is configured to not drive the stylus electrode with the first synchronization waveform of the stylus-initiated synchronization mode while operating in the display-initiated synchronization mode.

17. The active stylus of claim 15, wherein the controller is configured, subsequent to the active stylus becoming time synchronized with the second display device, to cause the active stylus to switch to operation in the stylus-initiated synchronization mode in which the stylus electrode is driven with the first synchronization waveform based on the transmit logic not receiving an expected response on the stylus electrode from the second display device for greater than a threshold duration.

18. The active stylus of claim 15, wherein the second synchronization waveform driven on the one or more electrodes of the second display device in the display-initiated synchronization mode is different than the first synchronization waveform driven on the one or more electrodes of the first display device in stylus-initiated synchronization mode.

* * * * *